(12) United States Patent
Kim et al.

(10) Patent No.: US 8,167,266 B2
(45) Date of Patent: May 1, 2012

(54) CLUTCH APPARATUS FOR ELECTRIC VALVE ACTUATOR

(75) Inventors: Keum mo Kim, Uiryeong (KR); Jae chul Lee, Yuseong (KR); Dae gon Kim, Yuseong (KR)

(73) Assignee: RPM Tech Co., Ltd., Daejeon (KR)

( * ) Notice: Subject to any disclaimer, the term of this patent is extended or adjusted under 35 U.S.C. 154(b) by 0 days.

(21) Appl. No.: 12/861,866

(22) Filed: Aug. 24, 2010

(65) Prior Publication Data
US 2012/0032100 A1 Feb. 9, 2012

(30) Foreign Application Priority Data

Aug. 4, 2010 (KR) .................. 10-2010-0075329

(51) Int. Cl.
*F16K 31/05* (2006.01)
(52) U.S. Cl. .............. 251/71; 251/129.03; 251/129.11
(58) Field of Classification Search .............. 251/68–71, 251/129.03, 129.11–129.13
See application file for complete search history.

(56) References Cited

U.S. PATENT DOCUMENTS

| | | | | |
|---|---|---|---|---|
| 3,258,985 A * | 7/1966 | Jordan | ............ | 477/13 |
| 3,685,790 A * | 8/1972 | Crowe | ............ | 251/67 |
| 3,808,895 A * | 5/1974 | Fitzwater | ............ | 74/2 |
| 4,111,070 A * | 9/1978 | Stratienko | ............ | 74/625 |
| 4,533,114 A * | 8/1985 | Cory et al. | ............ | 251/67 |
| 4,621,789 A * | 11/1986 | Fukamachi | ............ | 251/129.12 |
| 5,195,721 A * | 3/1993 | Akkerman | ............ | 251/129.13 |
| 6,371,440 B1 * | 4/2002 | Genga et al. | ............ | 251/129.03 |
| 6,431,317 B1 * | 8/2002 | Coe | ............ | 185/40 R |
| 7,017,882 B2 * | 3/2006 | Marsh et al. | ............ | 251/77 |
| 7,055,795 B2 * | 6/2006 | Lay | ............ | 251/129.03 |
| 7,469,717 B2 * | 12/2008 | Leadley | ............ | 137/559 |
| 2001/0035510 A1 * | 11/2001 | Oh | ............ | 251/129.03 |

* cited by examiner

Primary Examiner — John Bastianelli
(74) Attorney, Agent, or Firm — Galgano & Associates, PLLC; Thomas M. Galgano; Jessica G. Bower

(57) ABSTRACT

A clutch apparatus for an electric valve actuator, in which, where a manual handle is operated by an operator in a state that a power supply is stopped in a main motor, a coupling state between the manual handle and the main motor is released and the main motor is separately driven during a re-supply of the power, whereby preventing a safety accident of the operator of the manual handle.

5 Claims, 6 Drawing Sheets

- PRIOR ART -

CLUTCH APPARATUS FOR ELECTRIC VALVE ACTUATOR

BACKGROUND OF THE INVENTION

1. Field of the Invention

The present invention relates to a clutch apparatus for an electric valve actuator, and more particularly to a clutch apparatus for an electric valve actuator, in which, where a manual handle is operated by an operator in a state that a power supply is stopped in a main motor, a coupling state between the manual handle and the main motor is released and the main motor is separately driven during a re-supply of the power, whereby preventing a safety accident of the operator.

2. Description of the Prior Art

Generally, a valve, which is formed at a flow passage of a pipe, serves to control a flux or a pressure of a fluid. The valve includes an opening and closing portion for opening and closing the flow passage of the pipe in order that the fluid is passed through or blocked off it.

However, in the conventional art, since the opening and closing operation of the opening and closing portion is manually performed, there are problems in that it has a difficulty in accurately controlling the flux or the pressure of the fluid and spends lots of energy for operating the opening and closing portion.

In order to solve the above problems, a motor axis of the motor is connected to the opening and closing portion so as to perform the opening and closing operation of the opening and closing portion according to the rotation of the motor axis and a handle axis of a manual handle is engaged with one side of the motor axis so as to manually perform the opening and closing operation of the opening and closing portion through the manual handle in an emergency. However, since the manual handle engaged with the motor axis is rotated together with the motor axis during driving of the motor, there are problems in that it spends an unnecessary energy for rotating the manual handle in an automatic mode and shortens the life span thereof.

Also, where the manual handle is operated by the operator in a state that the power supply is stopped in the main motor, since the manual handle is suddenly rotated according to the driving of the motor axis during re-supply of the power, a safety accident of the operator of the manual handle can be occurred.

In order to solve the above problems, an automatic and hand-operated valve apparatus has been proposed, FIG. 1 is a sectional view of a conventional automatic and hand-operated valve apparatus.

As shown in FIG. 1, the conventional automatic and hand-operated valve apparatus includes an axis 311, which is coupled to a manual handle 310, vertically coupled to another axis 321, which is connected to an air motor 320 through a bevel gear 330; a bushing 340 having a clutch jaw 341; a jaw clutch 350 coupled to the axis 321, which is connected to the air motor 320; a first actuator 360 inserted into one side of the bushing 340; a second actuator 370 inserted into an outer surface of the jaw clutch 350; a spring (not shown) interposed between the first and second actuators 360 and 370; and an eccentric pin 311a, which is formed at an upper portion of the axis 311 of the manual handle 310, inserted into an elliptical hole, which is formed at a lower portion of the first actuator 360.

In the conventional automatic and hand-operated valve apparatus, the clutch is separated from the jaw of the bushing 340 and is coupled to the clutch jaw 341 of the entire rotation body through the elastic power of the spring (not shown) interposed between the first and second actuators 360 and 370 by operating the manual conversion lever, so that it can prevent the rotation of the bushing 340 during rotation of the axis 321 according to the operation of the air motor, thereby preventing the consumption of the unnecessary energy and the safety accident of the operator due to the companion rotation of the air motor 320 and the manual handle 310.

However, in the conventional automatic and hand-operated valve apparatus, the operation of the axis 321 of the air motor 320 and the clutch operation of the axis 311 of the manual handle 310 are manually performed. Hence, where the manual handle 310 is manually operated in a state that the power supply is stopped in the air motor in case of a blackout etc., since the manual handle 310 is rotated together with the air motor 320, the safety accident of the operator of the manual handle 310 can be still occurred. Also, since the coupling structures between each component element are complicated, there are problems in that the failure thereof can be remarkably increased and the manufacturing cost can be added.

SUMMARY OF THE INVENTION

Accordingly, the present invention has been made to solve the above-mentioned problems occurring in the prior art, and an object of the present invention is to provide a clutch apparatus for an electric valve actuator, in which, where a manual handle is operated by an operator in a state that a power supply is stopped in a main motor, a coupling state between the manual handle and the main motor is released and the main motor is separately driven during a re-supply of the power, thereby preventing a safety accident of the operator.

Another object of the present invention is to provide a clutch apparatus for an electric valve actuator, in which a coupling structure of a motor axis of the main motor and a handle axis of the manual handle is very simple, thereby remarkably reducing the failure and the manufacturing cost thereof.

In accordance with an aspect of the present invention, there is provided a clutch apparatus for an electric valve actuator having an opening and closing portion for opening and closing a flow passage of a fluid, an actuator body, a manual handle rotably coupled to one side of the actuator body, a motor axis of a main motor coupled to the opening and closing portion, and a handle axis, which is extended from one side of the manual handle to a rear portion thereof, connected to or separated from the motor axis comprising: a main gear coupled to an end portion of the handle axis; a clutch disc having a support groove located at an upper portion thereof and a coupling hole for inserting the clutch disc to the handle axis therethrough; an elastic means formed between the manual handle and the clutch disc in such a manner that the clutch disc is adhered to one side of the main gear; a passivity gear rotably coupled to the clutch disc and interlocked with the main gear to be rotated together with the main gear according to a rotation of the handle axis; a stopper having a rotation body rotably formed on the support groove of the clutch disc and a support rib protruded from the rotation body outwards and being rotated at a right angle between a connecting location of the passivity gears and the motor axis constructed in such a manner that the passivity gears is engaged with the motor axis in a state that an inner wall of the clutch disc, in which the support groove is formed, is supported on the rotation body and a separating location of the passivity gears and the motor axis constructed in such a manner that the passivity gears is separated from the motor axis in a state that the inner wall of the clutch disc, in which the support groove is formed, is supported on the support rib; and a rotation power providing means for providing a rotation power to the stopper formed at one side of the actuator body and connected to the stopper.

Preferably, the rotation power providing means comprises a driving motor mounted in an inside of the actuator body and a connection portion coupled to a driving axis of the driving motor and engaged with the rotation body of the stopper.

Preferably, the clutch apparatus for an electric valve actuator further comprises a detection portion formed in the vicinity of the connection portion and for detecting a connecting signal through a contact with the connection portion in a case that the stopper is located at the connecting location of the passivity gears and the motor axis.

Preferably, the clutch apparatus for an electric valve actuator further comprises a controller for controlling the rotation power providing means so as to allow the stopper to be located at the connecting location in a case that the power supply is stopped in the main motor or so as to allow the stopper to be located at the separating location from connecting location prior to the power supply of the main motor in a case that the power is re-supplied to the main motor in a state that the handle axis is rotated.

Preferably, a pair of the passivity gears is symmetrically formed on the clutch disc based on the motor axis.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, preferred embodiments of the present invention will be described with reference to the accompanying drawings.

Figure 1:
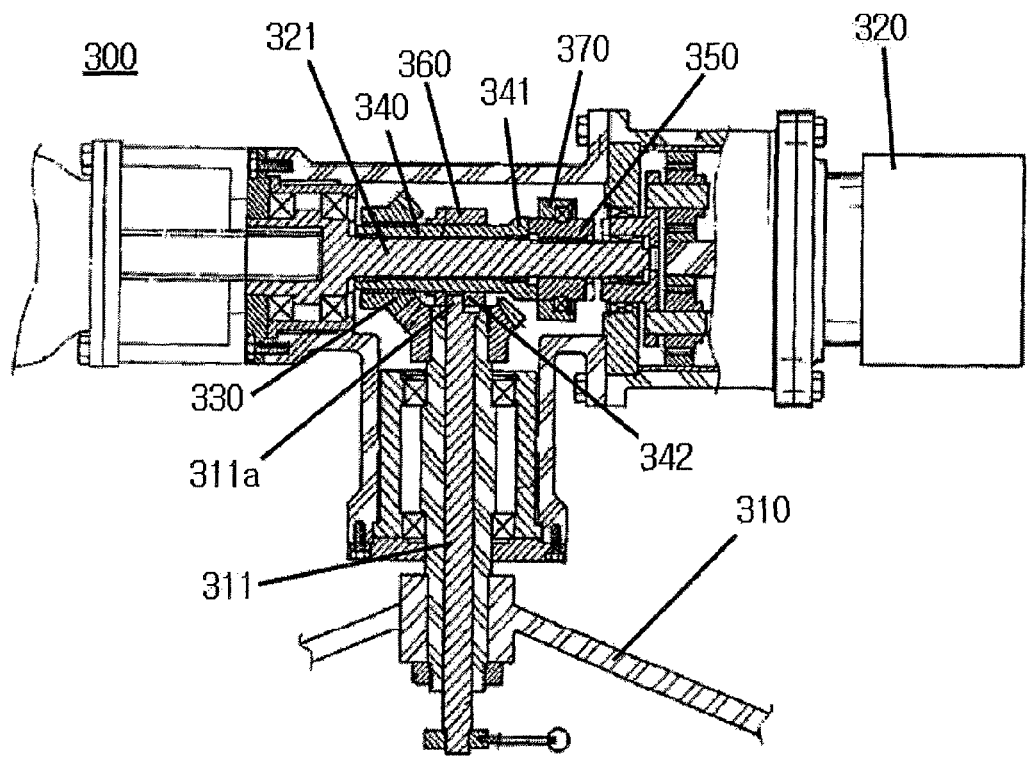
FIG. 1 is a sectional view of a conventional automatic and hand-operated valve apparatus.
Figure 2A:
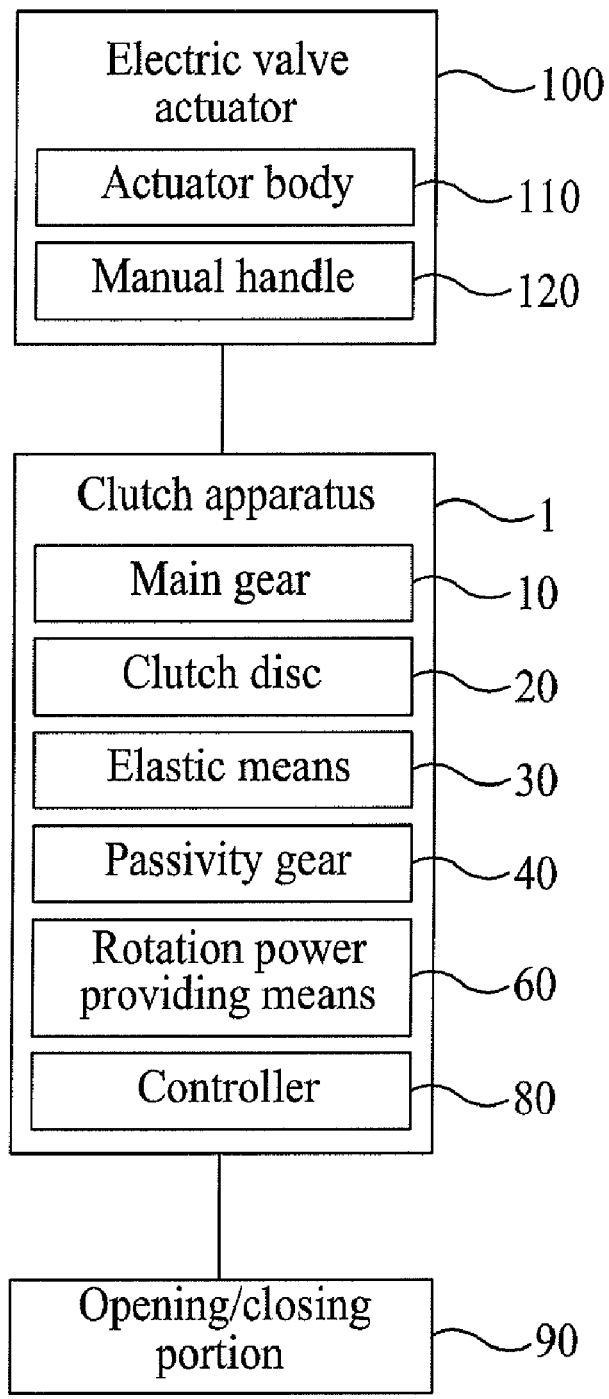
FIG. 2A is an entire block diagram illustrating an electric valve system having a clutch apparatus for an electric valve actuator according to the present invention.
Figure 2B:
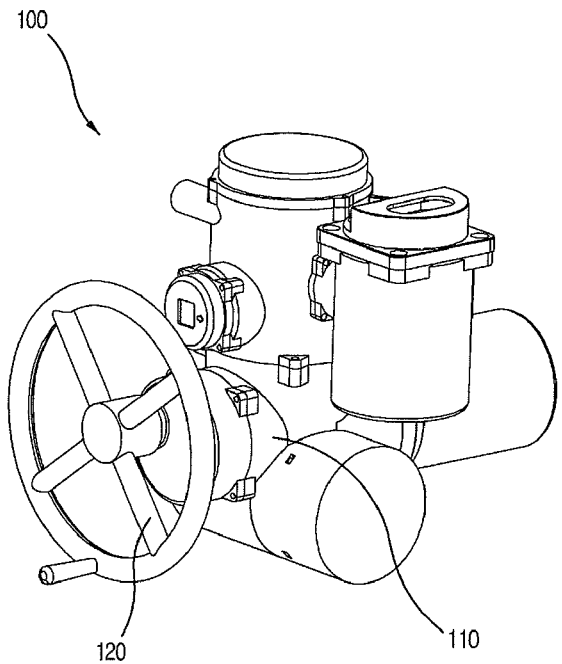
FIG. 2B is a perspective view of an electric valve having a clutch apparatus for an electric valve actuator according to the present invention.
Figure 3:
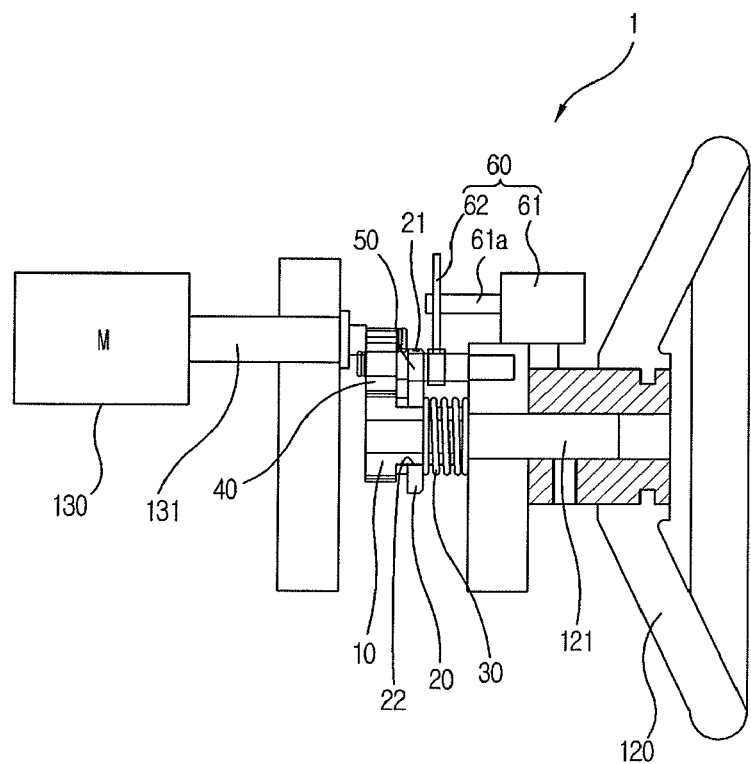
FIG. 3 is a sectional view of a clutch apparatus for an electric valve actuator according to the present invention.
Figure 4:
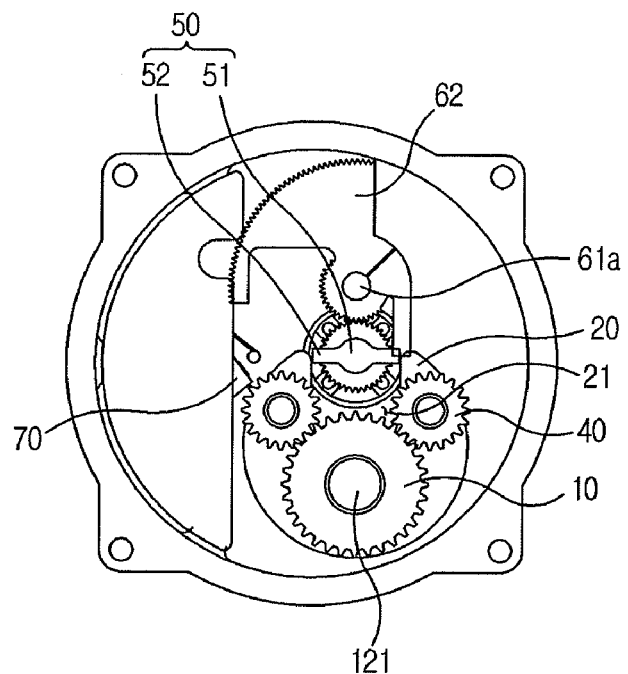
FIG. 4 is a sectional view illustrating a coupling structure of a stopper, a connection portion, and a detection portion of a clutch apparatus for an electric valve actuator according to the present invention.

FIG. 2A is an entire block diagram illustrating an electric valve system having a clutch apparatus for an electric valve actuator according to the present invention, FIG. 2B is a perspective view of an electric valve having a clutch apparatus for an electric valve actuator according to the present invention, FIG. 3 is a sectional view of a clutch apparatus for an electric valve actuator according to the present invention, and FIG. 4 is a sectional view illustrating a coupling structure of a stopper, a connection portion, and a detection portion of a clutch apparatus for an electric valve actuator according to the present invention.

As shown in FIG. 2, the electric valve actuator 100 according to the present invention includes an actuator body 110 and a manual handle 120 for manually opening and closing an opening/closing portion 90 rotably coupled to one side of the actuator body 110.

As shown in FIG. 3 and FIG. 4, the clutch apparatus 1 for an electric valve actuator according to the present invention includes a main gear 10, a clutch disc 20, an elastic means 30, a passivity gear 40, a rotation power providing means 60, and a controller 80.

The main gear 10 is inserted into and coupled to an end portion of a handle axis 121, which is extended from one side of the manual handle 120 to a rear portion thereof. Here, the main gear 10, which is connected to a motor axis 131 through the passivity gear 40, serves to transmit the rotation power of the manual handle 120 to the motor axis 131.

In this embodiment of the present invention, the main gear 10 is separately coupled to the end portion of the handle axis 121. However, the present invention is not limited to the coupling shape thereof. That is, the main gear 10 can be integrally formed at the end portion of the handle axis 121.

The clutch disc 20 of a circular plate includes an U-shaped support groove 21 located at an upper portion thereof and a coupling hole 22 for inserting the clutch disc 20 to one side of the handle axis 121 therethrough located at a lower portion thereof. Here, the clutch disc 20 is rotated together with the main gear 10 according to a friction force thereof during rotation of the manual handle 120. Also, the clutch disc 20 is supported on one side of the stopper 50, so that it serves to couple the passivity gear 40 to the motor axis 131 or separate the passivity gear 40 from the motor axis 131.

The elastic means 30 is formed between the manual handle 120 and the clutch disc 20. It serves to apply the elastic force in the direction of the clutch disc 20, so that the clutch disc 20 is adhered to one side of the main gear 10, thereby the clutch disc 20 is rotated together with the main gear 10 during the rotation of the main gear 10 owing to the friction force thereof.

The passivity gear 40 is located at one side surface of the clutch disc 20 in order that it is interlocked with the main gear 10. Accordingly, where the passivity gear 40 is interlocked with the motor axis 131, it serves to transmit the rotation power of the main gear 10 to the motor axis 131 together with the rotation of the main gear 10.

Here, a pair of passivity gears 40 is symmetrically formed around the support groove 21, which is located at one side surface of the clutch disc 20 (toward the motor axis 131). Accordingly, although the manual handle 120 is rotated left or right, the passivity gear 40, which is coupled to the clutch disc 20 rotated together with the handle axis 121, can be coupled to the motor axis 131.

The stopper 50 includes a rotation body 51 rotably formed on the support groove 21 of the clutch disc 20 and a support rib 52 protruded from the rotation body 51 outwards.

Such stopper 50 is rotated at a right angle between a connecting location of the passivity gears 40 and the motor axis 131 constructed in such a manner that the passivity gears 40 is engaged with the motor axis 131 in a state that an inner wall of the clutch disc 20, in which the support groove 21 is formed, is supported on the rotation body 51 and a separating location of the passivity gears 40 and the motor axis 131 constructed in such a manner that the passivity gears 40 is separated from the motor axis 131 in a state that the inner wall of the clutch disc 20, in which the support groove 21 is formed, is supported on the support rib 52. Accordingly, the stopper 50 serves to engage the passivity gears 40, which is coupled to the clutch disc 20, with the motor axis or be separated with from each other. The operation of the stopper 50 will be described in detail below.

The rotation power providing means 60 includes a driving motor 61 mounted in an inside of the actuator body 110 and a connection portion 62 coupled to a driving axis of the driving motor 61 and engaged with the rotation body 51 of the stopper 50. Accordingly, the rotation power providing means 60 serves to provide the rotation power to the stopper 50.

Here, the connection portion 62 serves to transmit the rotation power of the driving motor 61 to the stopper 50 as well as allow detection means 70 to generate a connecting signal through the contact with the detection means 70 in a case that the stopper 50 is located at the connecting location of the passivity gears 40 and the motor axis 131.

The detection portion 70 is formed in the vicinity of the connection portion 62, which is located in the actuator body 110. Accordingly, as described above, the detection portion 70 serve to generate the connecting signal through the contact with the connection portion 62 in a case that the stopper 50 is located the connecting location of the passivity gears 40 and the motor axis 131.

The controller 80 is formed in the actuator body 110. It serves to control the rotation power providing means 60 so as to allow the stopper 50 to be located at the connecting location in a case that the power supply is stopped in the main motor 130 or so as to allow the stopper 50 to be located at the separating location from connecting location prior to the power supply of the main motor 130 in a case that the power is re-supplied to the main motor 130 in a state that the handle axis is rotated.

Figure 5:
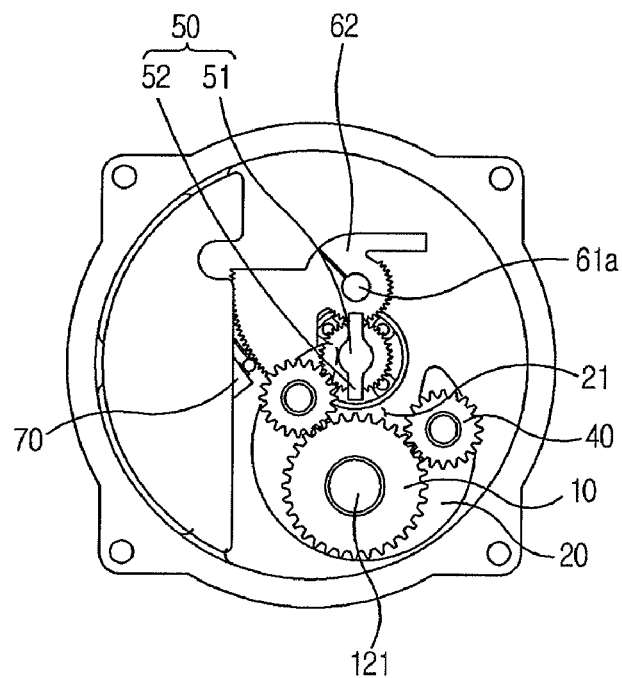
FIG. 5 and FIG. 6 are sectional views illustrating a connecting status of a manual handle and a main motor of a clutch apparatus for an electric valve actuator according to the present invention.
Figure 6:
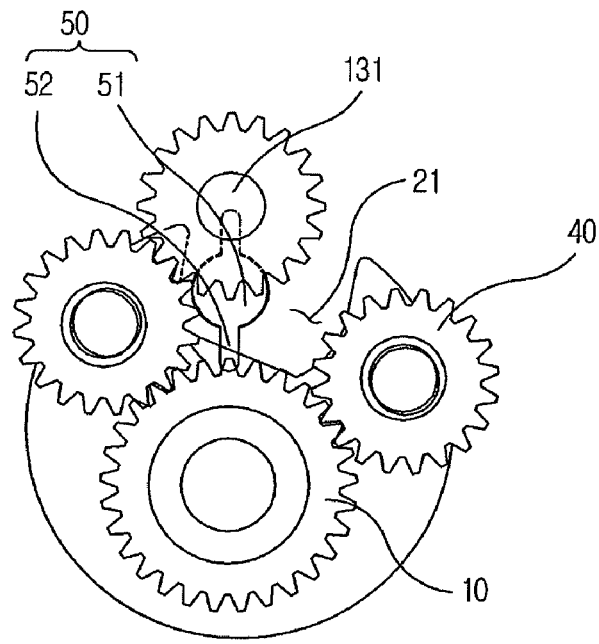
Figure 7:
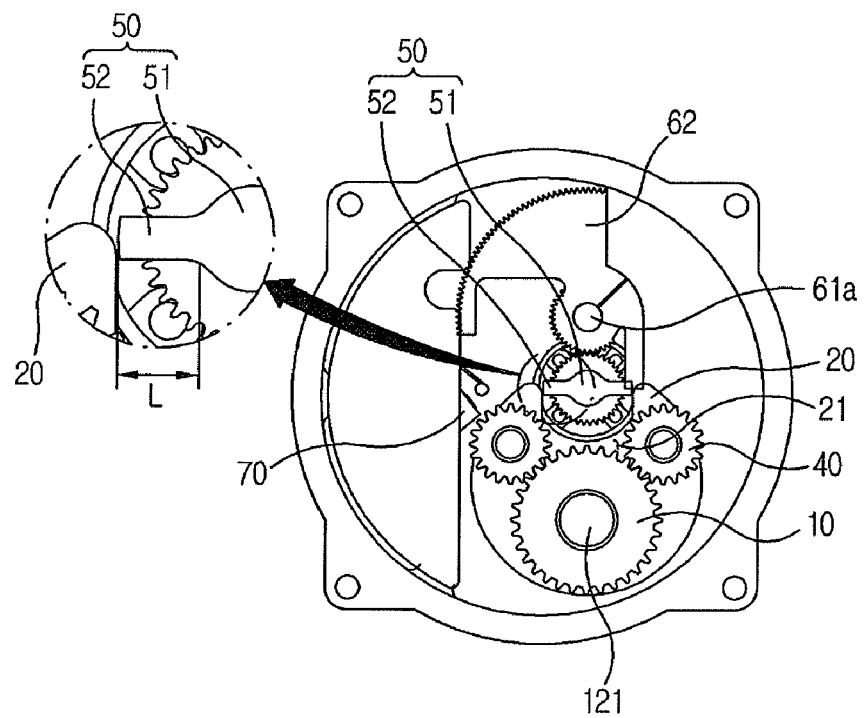
FIG. 7 and FIG. 8 are sectional views illustrating a separating status of a manual handle and a main motor of a clutch apparatus for an electric valve actuator according to the present invention.
Figure 8:
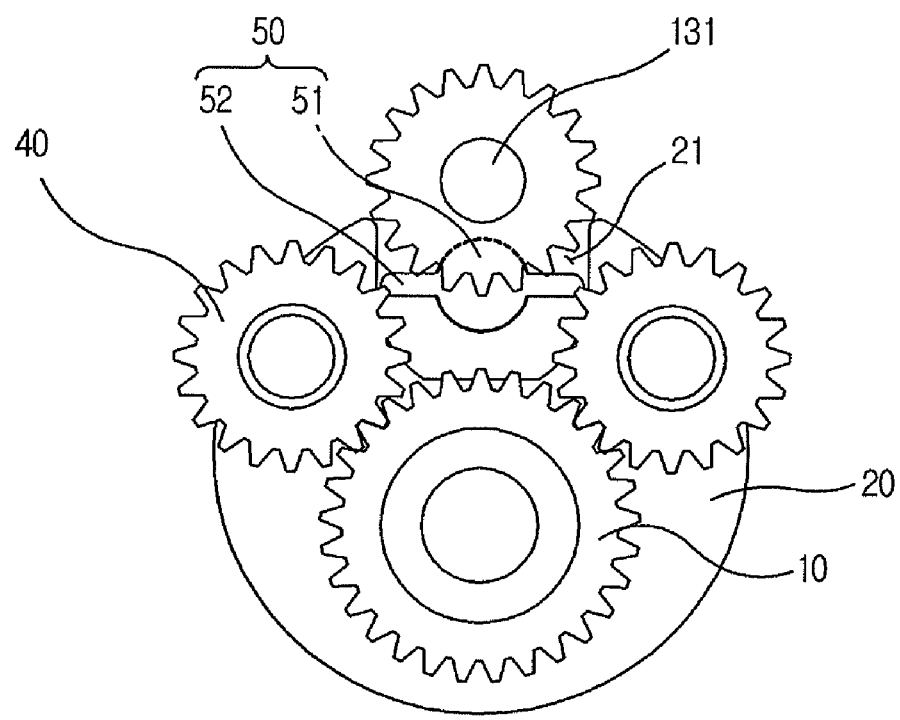

FIG. 5 and FIG. 6 are sectional views illustrating a connecting status of a manual handle and a main motor of a clutch apparatus for an electric valve actuator according to the present invention, and FIG. 7 and FIG. 8 are sectional views illustrating a separating status of a manual handle and a main motor of a clutch apparatus for an electric valve actuator according to the present invention.

Hereinafter, the operation of the clutch apparatus 1 for the electric valve actuator according to the present invention will be described with reference to the accompanying FIG. 5 through FIG. 8.

Where the power supply is stopped in the main motor 130, the controller 80 allows the rotation power providing means 60 to be controlled so as to drive the driving motor 61. Accordingly, as shown in FIG. 5, the connection portion 62 of the rotation power providing means 60 is rotated according to the rotation of the driving axis 61a of the driving motor 61 and the detection portion 70 generates the connecting signal through the contact with the connection portion 62, thereby the stopper 50 is rotated to the connecting location according to the rotation of the connection portion 62.

In a state that the stopper 50 is located at the connecting location, in order to operate the opening and closing portion 90, if the manual handle 120 is rotated by an operator, the handle axis 121 is rotated, thereby the main gear 10 is also rotated.

Continuously, as shown in FIG. 6, the clutch disc 20, which is adhered to the main gear 10 through the elastic member 30, is rotated together with the main gear 10. At this time, the inner wall of the clutch disc 20, in which the support groove 21 is formed, is supported on the rotation body 51 and then, the rotation thereof is stopped. Thereafter, the passivity gear 40 is engaged with the motor axis 131, so that the rotation power of the handle axis 121 is transmitted to the motor axis 131, thereby performing the opening and closing operation of the opening and closing portion 90.

In the meantime, where the power is re-supplied to the main motor 130 and the detection portion 70 generates the connecting signal, the controller 80 allows the rotation power providing means 60 to be controlled so as to drive the driving motor 61. Here, as shown in FIG. 7, when the driving motor 61 is driven, the connection portion 62 is rotated together with the driving axis 61a of the driving motor 61 and then, the contact status of the connection portion 62 and the detection portion 70 is released, so that the generation of the connecting signal is stopped. At this time, the stopper 50 is rotated to the separating location according to the rotation of the connection portion 62.

Here, as shown in FIG. 8, the inner wall of the clutch disc 20, in which the support groove 21 is formed, is pressurized by the support rib 52 of the stopper 50, so that it is reversely rotated to a length L of the support rib 52. Accordingly, a gap between the motor axis 131 and the passivity gear 40 is generated, thereby releasing a coupling state between the manual handle 120 and the main motor 130.

Continuously, where the coupling state between the manual handle 120 and the main motor 130 is released, the controller 80 allows the power to be applied to the main motor 130, thereby performing the opening and closing operation of the opening and closing portion 90 according to the driving of the main motor 130.

Hence, where the power is re-supplied to the main motor 130, the motor axis 131 is separated from the passivity gear 40 through the controller 80 prior to the power supply of the main motor 130, thereby preventing a safety accident of the operator of the manual handle 120, which is due to the malfunction of the manual handle 120 through the rotation of the main motor 130 and the passivity gear 40 in a case that the main motor 130 is driven in a state that the motor axis 131 is engaged with the passivity gear 40.

Although the present invention has been described with reference to Examples, those skilled in the art will appreciate that various modifications, additions and substitutions are possible, without departing from the scope and spirit of the invention as disclosed in the accompanying claims.

What is claimed is:

1. A clutch apparatus for an electric valve actuator having an opening and closing portion for opening and closing a flow passage of a fluid, an actuator body, a manual handle rotably coupled to one side of the actuator body, a motor axis of a main motor coupled to the opening and closing portion, and a handle axis, which is extended from one side of the manual handle to a rear portion thereof, connected to or separated from the motor axis comprising:
   a main gear coupled to an end portion of the handle axis;
   a clutch disc having a support groove located at an upper portion thereof and a coupling hole for inserting the clutch disc to the handle axis therethrough;
   an elastic means formed between the manual handle and the clutch disc in such a manner that the clutch disc is adhered to one side of the main gear;
   passivity gears rotably coupled to the clutch disc and interlocked with the main gear to be rotated together with the main gear according to a rotation of the handle axis;
   a stopper having a rotation body rotably formed above the support groove of the clutch disc and a support rib protruded from the rotation body outwards and being rotated at a right angle between a connecting location of the passivity gears and the motor axis constructed in such a manner that the passivity gears is engaged with the motor axis in a state that an inner wall of the clutch disc, in which the support groove is formed, is supported on the rotation body and a separating location of the passivity gears and the motor axis constructed in such a manner that the passivity gears is separated from the motor axis in a state that the inner wall of the clutch disc, in which the support groove is formed, is supported on the support rib; and a rotation power providing means for providing a rotation power to the stopper formed at one side of the actuator body and connected to the stopper.

2. A clutch apparatus for an electric valve actuator as claimed in claim 1, wherein the rotation power providing means comprises a driving motor mounted in an inside of the actuator body and a connection portion coupled to a driving axis of the driving motor and engaged with the rotation body of the stopper.

3. A clutch apparatus for an electric valve actuator as claimed in claim 2, further comprising a detection portion formed in the vicinity of the connection portion and for generating a connecting signal through a contact with the connection portion in a case that the stopper is located at the connecting location of the passivity gears and the motor axis.

4. A clutch apparatus for an electric valve actuator as claimed in claim 1, further comprising a controller for controlling the rotation power providing means so as to allow the stopper to be located at the connecting location in a case that the power supply is stopped in the main motor or so as to allow the stopper to be located at the separating location from connecting location prior to the power supply of the main motor in a case that the power is re-supplied to the main motor in a state that the handle axis is rotated.

5. A clutch apparatus for an electric valve actuator as claimed in claim 1, wherein a pair of the passivity gears is symmetrically formed on the clutch disc based on the motor axis.

* * * * *